United States
Yanagi et al.

[11] 3,658,634
[45] Apr. 25, 1972

[54] FIRE-RETARDANT SHEATH AND CORE TYPE CONJUGATE FIBER

[72] Inventors: Masana Yanagi; Itaru Nakamura, both of Mishima; Masayuki Ohosugi; Kiyosi Takizawa, both of Sunto-gun; Masanori Kakinami; Chikara Sano, both of Mishima, all of Japan

[73] Assignee: Toray Industries, Inc., Tokyo, Japan

[22] Filed: Aug. 20, 1970

[21] Appl. No.: 65,392

[52] U.S. Cl. ...................... 161/175, 106/15 FP, 161/403, 264/171
[51] Int. Cl. ........................ D02g 3/02, D06m 13/00
[58] Field of Search .............. 161/175, 403; 106/15 FP; 264/171, 211, DIG. 26; 252/8.1; 260/30.6 R, 33.8 R, 45.7 P, 75 H, 75 P, DIG. 24

[56] References Cited

UNITED STATES PATENTS

| | | | |
|---|---|---|---|
| 2,461,302 | 2/1949 | Truhlar | 106/15 FP |
| 2,926,096 | 2/1960 | Sukornbut | 106/15 FP |
| 3,513,119 | 5/1970 | Cannelongo | 106/15 FP |
| 3,551,279 | 12/1970 | Ando et al. | 161/175 |

*Primary Examiner*—Robert F. Burnett
*Assistant Examiner*—Linda C. Koeckert
*Attorney*—Paul and Paul

[57] ABSTRACT

The present invention relates to a sheath and core type conjugate fiber obtained by providing a core composed of polymer prepared by blending a specific halogen-substituted aromatic compound and phosphorus compound in predetermined amounts and by wrapping said core component with a sheath component.

The fire-retardancy of the sheath and core type conjugate fiber of this invention is remarkably high because a polymer having a high halogen concentration is used as the core component of the conjugate fiber.

14 Claims, 3 Drawing Figures

INVENTORS.
MASANA YANAGI, ITARU NAKAMURA, MASAYUKI OSUGI,
KIYOSHI TAKIZAWA, MASANORI KAKINAMI and CHIKARA SANO BY Paul & Paul
ATTORNEYS.

FIRE-RETARDANT SHEATH AND CORE TYPE CONJUGATE FIBER

The present invention relates to a sheath and core type conjugate fiber having improved fire-retardancy and more in particular, to a sheath and core type conjugate fiber having improved fire-retardancy, wherein the core component is prepared by blending a fire-retardant compound containing a halogen atom and a phosphorus compound.

Generally speaking, a thermoplastic synthetic linear polymer such as a polyester or a polyamide is effectively used for fibers. However, said thermoplastic linear polymers are combustible and therefore their applications are naturally restricted for reasons of safety.

Therefore, if it is possible to impart fire-retardancy to the thermoplastic polymers without deteriorating the useful properties of the thermoplastic polymers, they can be widely used in the field of inertia, construction and electric industries.

In accordance with the conventional method for making fibers composed of thermoplastic polymers into fire-retardant fibers, it is necessary to add a large amount of fire-retardant agent into polymer, but the addition of fire-retardant agent brings about a deterioration of the degree of polymerization of polymers, and, as a result, a deterioration of thermal and mechanical properties of the polymers. Therefore, such conventional methods are not practical.

On the other hand, the compounds containing chlorine or bromine atoms to be used as fire-retardant agents, are generally sublimated, and therefore the fire-retardant agents are sublimed and lost in the process for producing fire-retardant polymers or in after-finishing processes; accordingly, deteriorations of fire-retardancy or difficulties in use tend to occur more often than not.

On the other hand, when incorporated into fiber products, fire-retardant agents tend to be removed from the product as an incident to washing or dry-cleaning; even while the fire-retardant fibers are being used in the normal intended way, deterioration occurs.

In addition, the compounds containing chlorine or bromine atoms to be used as fire-retardant agents are unstable in most cases when exposed to ultraviolet rays. When ultraviolet rays are directed upon a fire-retardant polyester containing a fire-retardant agent, the fibers tend to take on a marked coloration, as is generally known to those skilled in the art.

The above mentioned drawbacks are serious in the case of textile fabrics such as curtains and the like, which should be fire-retardant in use.

Methods have been proposed according to which ultraviolet absorbents are provided for absorbing ultraviolet rays, but satisfactory results have not been obtained with these as yet.

More specifically speaking, aromatic compounds containing substituted halogen are disclosed in British Pat. No. 1,100,605 as fire-retardant agents. On the other hand, in accordance with German Pat. No. 1,191,569, an unsaturated polyester is made fire-retardant by coemploying a halogen substituted aromatic compound and antimony oxide. On the other hand, a phosphorus containing compound is proposed as a fire-retardant agent in Japanese Pat. No. 28988/1969.

However, as a matter of fact, only very few fire-retardant polymers can be used in actual practice, although they are said to have fire-retardant effects, because there are restrictions such as the conditions employed in production attributable to the properties of the fire-retardant agent, or to the properties of the polymers into which they are to be incorporated.

For example, it is necessary to heat polyethylene terephthalate at a temperature above its melting point of 260° C, when the fire-retardant agent is mixed into it. However, most halogen compounds such as halogenated aliphatic hydrocarbons tend to decompose at temperatures above 260° C.

With most such halogenated compounds, polyethylene terephthalate takes on a black or blackish brown coloration and because of this it cannot be used commercially at all.

When polyethylene terephthalate is appropriately processed without employing any melt-mixing process, and thereafter the surface thereof is coated with a conventional fire-retardant agent, and curing is carried out, a temporary effect can be obtained, but the effect disappears while the product is being used.

In particular, when such fire-retardancy polymers are used in textiles, the so-called "feel" or "hand" of the textile material is lost entirely.

The fundamental object of the present invention is to provide a new conjugate fiber having improved fire-retardant properties.

Another object of the present invention is to provide a conjugate fiber having fire-retardancy without bringing about the deterioration of thermal and mechanical properties of the polymer or of the degree of polymerization of the polymer.

Another object of the present invention is to provide a conjugate fiber having fire-retardancy without bringing about unnecessary coloring caused by the presence of the fire-retardant agent to be used in the production thereof.

Another object of the present invention is to provide a conjugate fiber having fire-retardancy without bringing about the difficulties heretofore discussed.

Other objects will be apparent from the description which follows.

The conjugate fiber which fulfils the above mentioned objects is a sheath and core type conjugate fiber having fire-retardancy which is characterized in that the core polymer contains (a) a halogenated fire-retardant compound (i) represented by the general formula [I] given below, or a compound selected from naphthalene (ii) substituted by chlorine or bromine and anthracene (iii) substituted by chlorine or bromine, and (b) a phosphorus-containing compound selected from these compounds represented by the general formulae [II] and [III]. The halogenated compounds (a) and the phosphorus compounds (b) are mixed with the core polymer in such amounts that the total amount of halogen contained therein is more than about 5 percent weight based on the amount of the core polymer, in relative quantities as set forth in formula [IV] which appears hereinafter.

The formulas are as follows:

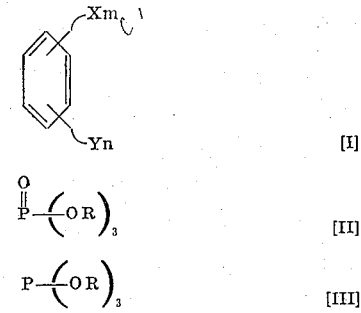

wherein X is selected from chlorine and bromine; Y is selected from —R′, —OR′, and —OR″OR′, wherein R′ is an alkyl radical having from one to 10 carbon atoms, an aryl radical having from six to 24 atoms, an aralkyl radical having from six to 16 carbon atoms, and an alkaryl radical having from six to 16 atoms, and the halides thereof; R″ is an alkylene radical having from one to six carbon atoms; n and m are positive integers satisfying the formula $$6 \geq m \geq 1$$
$$5 \geq n \geq 0$$

R is selected from alkyl radicals having from one to 10 carbon atoms, aryl radicals having from six to 24 carbon atoms, aralkyl radicals having from six to 16 atoms, cycloalkyl radicals having from five to seven carbon atoms and halides thereof.

$$\frac{\text{Weight percent of halogen of the compound represented by the general formula [I], and/or naphthalene substituted by chlorine or bromine and/or anthracene substituted by chlorine or bromine the amount of thermoplastic polymer}}{\text{Weight percent of the member selected from the group of the compounds represented by the general formulae [II] and [III] against the weight of thermoplastic polymer}} = 3 \text{ to } 50 \quad \text{[IV]}$$

The sheath and core type conjugate fiber of the present invention can be obtained by spinning of the conjugate fiber by using a thermoplastic polymer as the core component which has been prepared by blending a fire-retardant compound having chlorine or bromine atoms represented by the general formula [I] and/or naphthalene substituted by chlorine or bromine and/or anthracene substituted by chlorine or bromine, and phosphorus compounds represented by the general formula [II] and/or [III].

It is possible either to blend or not to blend the compound represented by the general formula set forth above, along with the polymer to be used for the sheath component in the sheath and core type conjugate fiber of the present invention.

However, when the halogenated compound represented by the general formula is blended along with the polymer of the sheath component, it is preferable that the amount of halogen based on the amount of the polymer should not exceed 10.0 percent by weight or more, preferably not exceed 5.0 percent by weight, and the amount of halogen in the sheath component should be less than the amount of halogen in the core component.

DRAWINGS

Figure 1:
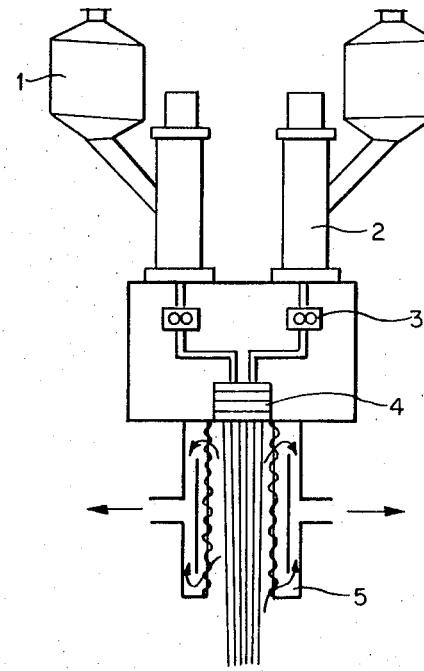
FIG. 1 is a diagram showing the vertical cross-sectional view of a device for spinning conjugate fibers capable of being used in the practice of the present invention.

The following is a detailed explanation of the present invention.

The compound having a chlorine and/or bromine atom to be used has at least one halogen atom nuclear substituted on an aromatic nucleus such as a benzene, naphthalene or anthracene nucleus or derivative thereof.

The following are concrete examples of the above mentioned compounds having a chlorine and/or bromine atom to be used in practicing the present invention:

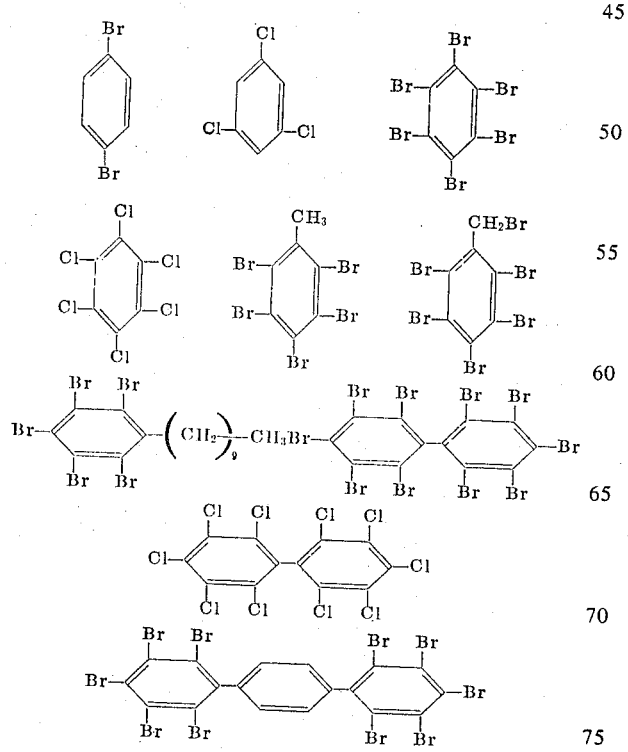

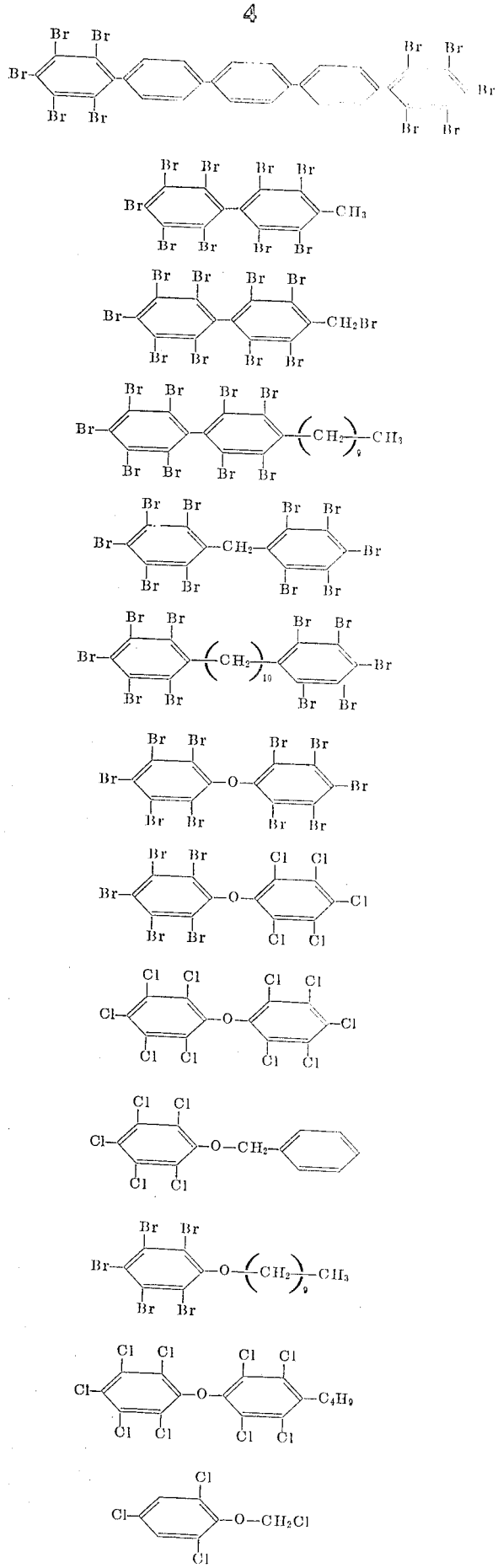

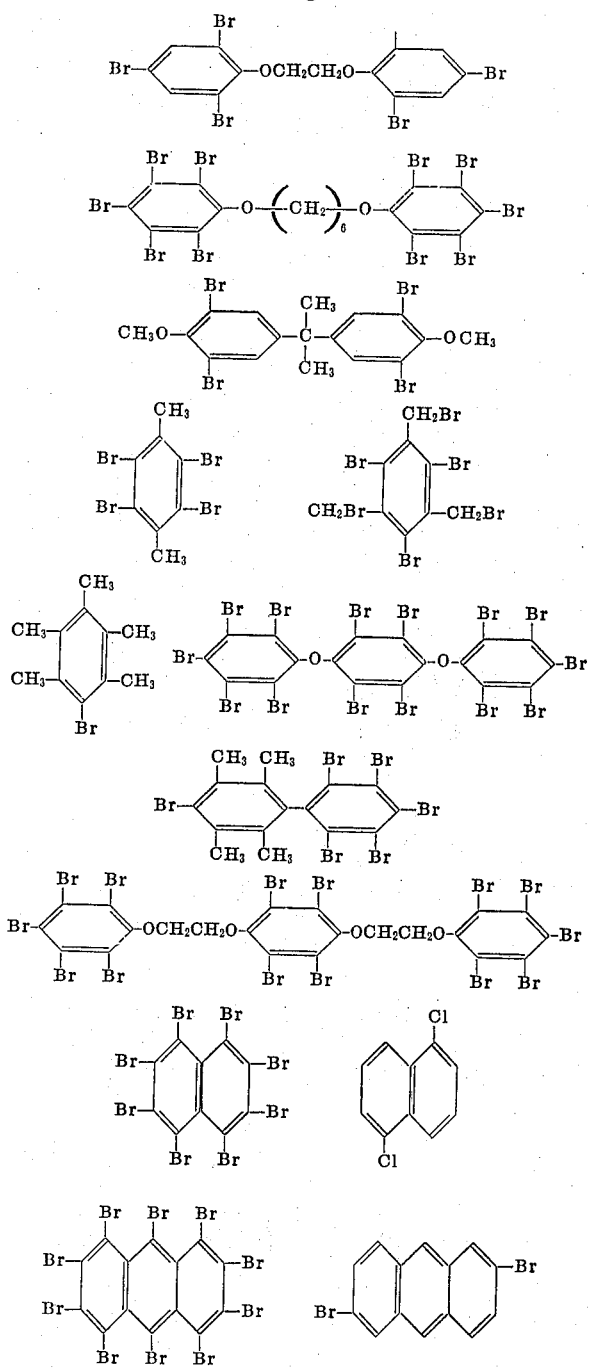

Phosphorus compounds to be used in the practice of the present invention are compounds represented by the above given general formulas [II] or [III], which can be used independently or in the form of a mixture.

The following concrete examples of such compounds are listed.

Compounds of the general Formula [II]:

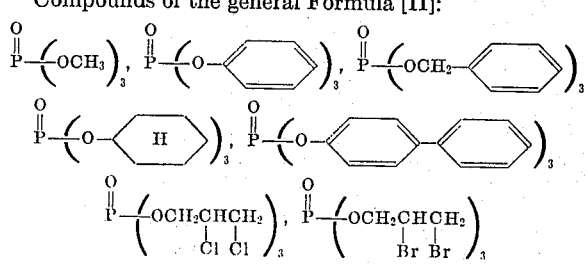

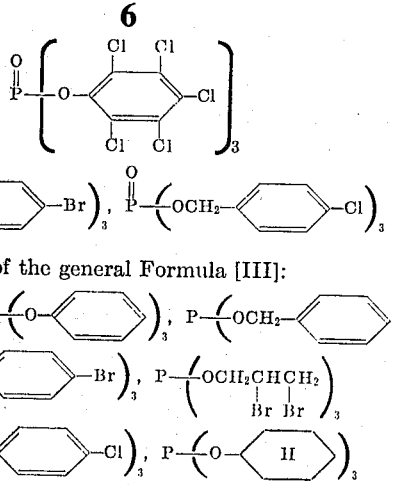

Compounds of the general Formula [III]:

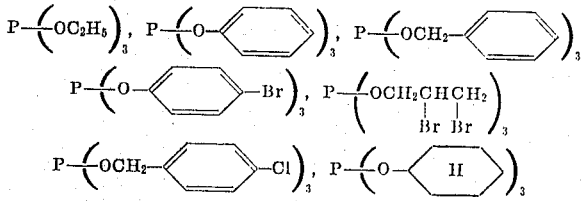

As the thermoplastic polymer to be used in the practice of the present invention, any thermoplastic polymer can be used, provided it can be blended along with the compound represented by the general formula given above, and provided the resulting blend can be melt-spun, but in particular, the effect of the present invention is remarkably apparent when it is applied to polyester and polyamide.

As polyester, such polyester wherein more than 70 percent is polyethylene terephthalate may be used, such as polyethylene terephthalate or a copolymerized polyester prepared by copolymerizing polyethylene terephthalate along with conventional copolymerizable dioxy components or dicarboxylic acid components.

The polyesters particularly useful in the present invention include the following:
  dicarboxylic acids such as
    isophthalic acid,
    adipic acid,
    phthalic acid, etc., and
  diols such as
    propylene glycol,
    diethylene glycol,
    1,4-cyclohexane dimethanol,
    butane diol, etc.

A small amount of polyfunctional compound such as trimellitic acid, boric acid, or pentaerythritol can be included therein.

Mixed polyesters prepared by blending less than 30% by weight of polyester composed of conventional diols or dicarboxylic acids along with polyethylene terephthalate, are also included.

Polyamides to be used in the present invention include Nylon 6, Nylon 66, and copolymerized and mixed polyamides wherein more than 70 percent is Nylon 6 and Nylon 66.

Dicarboxylic acids and diamines composing copolymerized and mixed polyamides include the conventional sebacic acid, succinic acid, p-phenylene diacetic acid, ethylene diamine, teremethylene diamine, decamethylene diamine, etc.

On the other hand, nylons obtained from lactams, such as polyundeca-amide can be used as the polyamide to be blended.

In accordance with the present invention, the composition is prepared by blending the compound represented by the general formula [I] and/or naphthalene and/or anthracene nuclear substituted with chlorine or bromine, and the compound represented by the general formula [II] and/or [III] along with the thermoplastic polymer in an amount calculated as halogen greater than 5.0 percent by weight or preferably more than 10.0 percent by weight based upon the amount of thermoplastic polymer, in such a manner that the formula [IV] is satisfied, and the product is used as the core component, and the resulting blend is melt-spun to produce a conjugate fiber of improved fire-retardancy.

Formula [IV] is as follows:

$$\frac{\text{Weight percent of halogen contained in the compound represented by the general Formula [I], and/or naphthalene substituted by chlorine or bromine and/or anthracene substituted by chlorine or bromine based on the amount of thermoplastic polymer}}{\text{Weight percent of the member selected from the compounds represented by the general Formulae [II] and [III] based on the amount of thermoplastic polymer}} = 3 \text{ to } 50 \quad [\text{IV}]$$

In regard to the amount of halogen in accordance with the present invention, when the compound of the general formula [II] and/or [III] is substituted by halogen, it is calculated along with the amount of halogen contained in the compound represented by the general formula [I] and/or naphthalene and/or anthracene nuclear substituted by chlorine and/or bromine.

Thus, the upper limit of the amount of halogen in the core component is less than 50.0 percent by weight and preferably less than 30.0 percent by weight based on the amount of the polymer.

When the amount of halogen is less than about 5.0 percent by weight, it is impossible to obtain excellent fire-retardancy and the polymer becomes combustible as in the case of ordinary polymers.

On the other hand, when the amount of halogen is in excess of 50.0 percent by weight, the deterioration of physical properties thereof as fiber, in particular the strength or elongation of the yarn produced therefrom is remarkable, and it cannot be used as fiber any longer.

On the other hand, difficulties such as the clogging of the spinneret with fire-retardancy agent, are encountered in carrying out the melt-spinning operation.

Thus, in the actual practice of the present invention, when the halogen is chlorine, the chlorine should be present in in an amount of from 10.0 to 50.0 percent by weight based on the weight of the polymer. More preferably, it should be within the range from 15.0 to 30.0 percent by weight. When the halogen is bromine, the amount of bromine should be from 5.0 percent by weight to 40.0 percent by weight, preferably from 8.0 to 20.0 percent by weight.

On the other hand, in regard to the amount of halogen contained in the sheath component, it is preferable not to exceed 10.0 percent by weight, preferably 5.0 percent. More particularly, when the halogen is chlorine, it should not go beyond 5.0 percent by weight based on the weight of polymer. When the halogen is bromine, its weight should exceed 5.0 percent by weight, preferably not exceeding 3.0 percent by weight based on the weight of polymer.

The amount of halogen contained in the polymer in accordance with the present invention can be measured in the following manner as is disclosed in the publications listed below:

Bunseki Kagaku Koza

"Analysis of organic elements" by Tetsuo Mitsui, page 70, Published by Kyoritsu Publishing Co., Ltd. of Tokyo, Japan (1958)

Hand Book of Chemical Analysis by S. Hirano, page 228, Published by Sangyo Tosho Publishing Co., Ltd. of Tokyo, Japan (1961)

In making the measurement the sample is heated and burned in a stream of oxygen in the presence of platinum catalyst, and the resulting product is absorbed in the heated electrolytic silver.

Chlorine and bromine are respectively turned into silver chloride and silver bromide, and the amounts of chlorine and bromine can be quantitatively determined from the weight increase of the silver.

The analysis of hexabromobenzene was carried out as blank test in accordance with the above described method, and the amount of bromine agreed with the theoretical value with a maximum difference of ±0.5 percent by weight.

Fire-retardancy can be singly determined by the amount of halogen contained therein, and it is satisfactory that the fire-retardant conjugate yarn of the present invention should contain the above described amount of halogen.

On the other hand, in accordance with the present invention, a large amount of the compound containing chlorine or bromine is contained in the polymer of the core component, and therefore, generally speaking, it is necessary to increase the amount of chlorine or bromine to be contained in the core component.

In regard to the blending ratio of polymer of the core component and the polymer of the sheath component wherein the concentration of chlorine or bromine is high, it is necessary to determine the blending ratio thereof in such a manner that chlorine or bromine in an amount required to attain the desired fire-retardancy, will be present in the polyester.

The amount of the phosphorus compound to be used in the present invention represented by the general formula [II] and/or [III] is determined in accordance with the formula [IV].

With respect to formula [IV], when the value of the ratio is more than 50, it is impossible to improve the thermal stability of the polymer containing the compound having chlorine or bromine, but the deterioration of polymerization degree and the coloring of polymer become quite extreme.

When the value of formula [IV] is below 3, the amount of the phosphorus compound becomes excessive, and the original object of the addition of phosphorus compound is perfectly saturated, but on the contrary, a deterioration of the polymerization degree of the polymer is brought about, and as a result, the quality of yarn obtained therefrom deteriorates or its spinnability characteristics become poor.

In addition, it is surprising that when the value of the formula [IV] is below 3, the fire-retardancy actually deteriorates as has been determined by many actual runs.

Therefore, in order to attain the objects of the present invention, the ratio of the halogen compound and phosphorous compound should be within the range specified by formula [IV].

The ratio by volume of the core component and the sheath component is from 80/20 to 20/80.

When the ratio of core component and sheath component goes above 80/20, the composite spinning state becomes poor and the conjugate film tends to become non-uniform. At the same time, the deterioration of photostability is brought about, and the sublimation of fire-retardant agent of the core component results in carrying out the spinning operation, and this becomes the cause of such difficulties. Therefore it is not desirable to have the ratio above 80/20.

On the other hand, when this ratio is less than 20/80, it is necessary to increase the amount of halogen in the core component sharply if a predetermined amount of halogen is contained in the yarn, and therefore the conjugate-spinning state becomes poor that it is impossible to produce a yarn having satisfactory quality from a practical point of view.

In order to attain a constant desired fire-retardancy, it is necessary to mix a predetermined amount of chlorine or bromine compound in the conjugate fiber, and for this purpose, the amount of halogen contained in the core portion is increased as much as possible, to the effect that the thickness of sheath component should be as thick as possible for attaining the object of the present invention.

When the thickness of the sheath component is increased, the sublimation of fire-retardant agent can be prevented at the time the spinning is carried out, and the removal of fire-retardant agent brought about at the time when the dyeing process is carried out, can be completely prevented.

When the thickness of the sheath component is increased, the diffusion of ultraviolet rays and absorption thereof can be increased, and the coloring of the core component caused by ultraviolet rays is reduced, and therefore it is preferable to increase thickness of the sheath component to be more than 1 $\mu$ or preferably more than 2 $\mu$, for the foregoing reasons.

In accordance with the present invention, techniques that are conventional for mixing polymers may be employed in mixing compounds containing chlorine or bromine along with polymer.

For example, after having terminated the polymerization of the polymer, a chlorine or a bromine compound can be admixed into the polymerization vessel, or after the chlorine or bromine compound is mixed along with the pellets of polymer, the mixture can be melt-kneaded in an extruder.

The prior art can be employed in carrying out conjugate-spinning operations.

Figure 2:
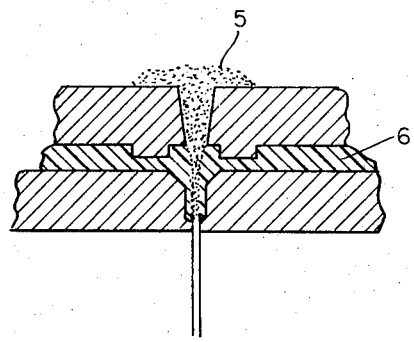
FIG. 2 is a diagram showing an enlarged vertical cross-sectional view of the spinneret which constitutes one portion of the embodiment of FIG. 1.

For example, referring to the drawings the core component polymer 5 and sheath component polymer 6 are charged into the hopper 1 by using the composite spinning machine as is shown in FIG. 1 and the spinneret of FIG. 2, and the respective components are melted in an extruder 2, and the molten mixture is extruded through the spinneret 4 after having been scaled by a gear pump 3, to shape the mixture into fiber form.

There are various forms of sheath and core type conjugate fibers of the present invention. For example, such cross-section forms as appear in FIG. 3 can be used.

Figure 3:
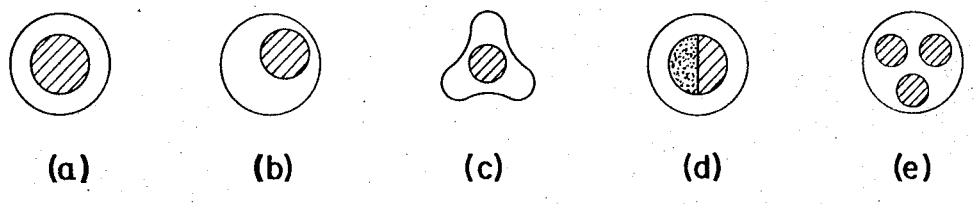
FIG. 3 is a diagram showing cross-sectional views of several different sheath and core type conjugate fibers of the present invention.

In the diagram of FIG. 3, (a) is a sheath-and-core conjugate fiber of the concentric type, (b) is an embodiment of the eccentric type, (c) is another embodiment wherein the core is cylindrical and the sheath is of trilobal form, (d) is another embodiment in which the core is in two sections adhered together and (e) is another embodiment in which a plurality of separate cores is used. The embodiment (e) is intended to be included within our definition of the term "conjugate fiber" as it is used in the present invention and in this specification and in the appended claims. And the conjugate fiber having the cross-section (b) can be obtained by the method described in U.S. Pat. No. 2,931,091. Simultaneously the conjugate fiber having the cross-section (d) can be obtained by the method described in Japanese Pat. No. 69/29522. And the conjugate fiber having cross-section (e) also can be obtained by the method described in Japanese Pat. No. 68/28771.

The polymer of the core component and the polymer of the sheath component can be of the same kind, or they can be different polymers.

In accordance with the present invention it is possible to obtain an excellent fire-retardant effect by coemploying antimony oxide, zirconium oxide, boron oxide, or the generally known halides and like metal compound within such a range that the effect of the present invention is obtained, along with the polymer, in addition to the compound represented by the general formula [I] and/or naphthalenes and/or anthracenes and the compounds represented by the general formulae [II] and [III].

On the other hand, carbon black, titanium oxide, silicic acid anhydride and such like pigments; or antioxidant, photoresistive agents, antistatic agents, or anticoloring agents can be added without any difficulty.

The sheath-and-core conjugate fiber of this invention has the following advantages when compared with conventional fiber;

1. It has been found necessary to add a large amount of fire retardant agent in order to make fibers fire-retardant, but the fire-retardant agent tends to become sublimed, removed, or otherwise to escape from the fiber during the production and after-finishing processes, and while being used as the product, and therefore it is an undesirable industrial health hazard. In addition, it is detrimental that the amount of fire-retardant agent and the fire-retardancy of the fiber are reduced.

On the other hand, in accordance with the present invention, the fire retardant core-component is wrapped with the sheath component in such a way that the sublimation, removal or elution of the fire-retardant agent from the fiber can be almost completely prevented, and almost all the aforementioned disadvantages are overcome.

2. In conventional fibers, a large amount of fire-retardant agent is uniformly dispersed into the polymer, causing a substantial deterioration of the mechanical properties of the synthetic fiber and this causes a remarkable deterioration of yarn quality of spinnability.

However, in the conjugate fiber of the present invention, a large amount of fire-retardant agent is concentrated in the core component; therefore when compared with conventional yarns containing the same amount of fire-retardant agent, the tendency of the yarn to break and its quality deterioration during spinning are remarkably improved.

3. Fire retardant fibers prepared by adding chlorine or bromine are sensitive to coloration by ultraviolet ray light. Frequently, this is so serious polymer cannot be used as a commercial product any longer; the addition of the usual ultraviolet ray absorbent compounds is quite ineffective.

On the other hand, in accordance with the conjugate fiber of the present invention, the sheath component containing little or no chlorine or bromine compound diffuses or absorbs harmful ultraviolet rays, and the ultraviolet rays do not penetrate significantly into the core component, and therefore very little discoloration is caused. Even if the core becomes discolored the conjugate fiber appears as though it were not discolored at all, because the sheath component covers and conceals the core component.

4. The compound containing chlorine or bromine tends to undergo thermal decomposition when exposed to a high temperature for a long time, and as a result, the fiber is colored, or the degree of polymerization is lowered. The deterioration of the degree of polymerization brings about a deterioration of yarn quality or spinnability; when the fiber is colored its commercial value is seriously reduced, especially when the fiber is white.

On the other hand, a small amount of phosphorus compound is normally added to the polymer (or more in particular to a polyester), but the addition of such a small amount of phosphorus compound does not solve the aforementioned problem at all.

However, in accordance with the present invention, large amounts of certain organic phosphorus compounds are added.

For a more detailed description of the present invention, reference is made to the following specific examples.

The examples are intended merely to be illustrative and not limitative.

In the examples, all parts and percentages are by weight unless otherwise indicated.

EXAMPLE 1

A core polymer was prepared in the following manner to produce a conjugate composite fiber.

Polyethylene terephthalate [intrinsic viscosity as measured in 25° C orthochlorophenol=0.803/softening point=26.0° C] was dried in vacuum at 180° C for 4 hours.

26 parts by weight of hexabromobenzene having been dried in vacuum at 100° C for 16 hours, and 3 parts by weight of triphenylphosphate were mixed along with 100 parts by weight of the above prepared polyethylene terephthalate in a nitrogen gas atmosphere by using V-type blender at a speed of 50 rpm for 20 minutes.

The resulting mixture was mixed and extruded by using a worm type extruder having a flighted screw [the diameter thereof being 30 mm] at a cylinder temperature of 285° C, at a dye temperature of 290° C and at a speed of 100 rpm, to produce pellets.

The intrinsic viscosity of the resulting pellets at 25° C in orthochlorophenol was 0.67.

The amount of halogen contained in the pellets based on the amount of polyethylene terephthalate was 22.5 percent by weight.

The pellets were dried at 130° C in vacuum for 10 hours, and the core component was prepared.

On the other hand, polyethylene terephthalate [intrinsic viscosity as measured in orthochlorophenyl at 25° C=0.653

/softening point=261.8° C] was dried at 160° C in vacuum for 4 hours, and the sheath component was prepared.

Next, the respective polymers of core component and the sheath component were melted at 280° C and 290° C, and spinning was carried out at 1,000 m/min. by using concentric conjugate fiber spinning nozzle having 36 holes while scaling the molten polymers with 1.6 ml/rev. gear pumps at a number of revolutions of 5.3 rpm and 9.3 rpm.

Hexabromobenzene which was sublimed right below the spinning nozzle was collected with a suction duct and the amount of the collected hexabromobenzene was 0.3 g per 1 kg of polymer.

The resulting undrawn yarn was drawn at a ratio of 3.41 at 155° C and the elution of hexabromobenzene was not observed during or as a result of the drawing process.

The thickness of the sheath component was $3.2\mu$, and the volume ratio of the core component and the sheath component was 45/55.

The resulting yarn was knitted by using a circular hosiery knitting machine [Gauge 192 lines/diameter= 3 inches].

The characteristics of the resulting samples are given in Table 1.

In addition to the results obtained in Example 1, the results obtained in the case when the additive of the present invention was not used [Comparative Example 1], the results obtained in the case where the conditions were the same as in Example 1 except for the point that hexabromobenzene was not used [Comparative Example 2], and the results obtained in the case where the conditions were the same as in Example 1 except that triphenylphosphate was not used [Comparative Example 3], are given in Table 1.

In Table 1, scouring, dyeing and dry-cleaning, resin finishing and the test method for determining fire-retardancy were carried out in the following manner. [In all of the following examples, they were also carried out in the same manner as in Example 1].

a. SCOURING:

2 g of nonionic surface active agent, 1 g of $Na_2CO_3$ and 1 litre of water based on 50 g of the sample were placed in a vibration type dyeing machine and the treatment was carried out at 60° C for 20 minutes.

b. DYEING:

The scoured sample was dyed by using 1 percent by weight of C.I. Disperse Yellow B (disperse dye) and 0.5 percent by weight of Sunsalt No. 1200 produced by Nikka Chemical Co., Ltd. as a dispersing agent at a bath ratio of 1:40 at 120° C for 60 minutes.

c. DRY-CLEANING:

200 ml of tetrachloroethylene, 2 g of nonionic surface active agent, and 3 g of sodium dodecylbenzene sulfonate were mixed to prepare the solution for treating 3 g of the sample, and the sample was treated by using a vibration type dyeing machine at 30° C for 30 minutes. After the treatment, the treated sample was dried in air.

The foregoing treatment was repeated five times.

d. RESIN FINISHING:

The sample having been dyed as mentioned above was dipped into a solution prepared in the following manner:
Melamine resin    5 g/liter
Hardening catalyst    0.5 g/liter

[wherein the melamine resin to be used is an 80 percent aqueous solution of hexamethylolmelamine primary condensation product, and the hardening catalyst is a 35 percent aqueous solution of a tertiary amine hydrochlorate].

Thereafter, the sample was squeezed with a mangle in such a manner that the squeezing rate was 50 percent. After having squeezed out the water, it was predried at 80° C for 10 minutes and then was subjected to baking treatment at 150° C for 2 minutes.

e. TEST METHOD FOR DETERMINING FIRE-RETARDANCY

A sample [the length thereof being 15 cm, the width thereof being 10 cm] was coiled in a lateral direction so as to make the diameter of the coil 2 cm, and in a combustion tester box defined in JIS Z 2150 [which describes the test method for determining the fire-retardancy of board, plate, sheet or film whose thickness is less than 5 mm by means of a Bunsen burner, and describes the combustion tester box to be used therefor] the upper end of the sample was lightly held with clamps to perpendicularly support the same in the lengthwise direction and the diffused flame of city gas (the length of the flame was 3 cm) was contacted by means of a Bunsen burner against the lower end of the sample for three seconds, and the time for combustion after having removed the source of flame, was measured.

Said operation was repeated till the whole sample was burned away, and the number of the contacts of the flame against the lower end of the sample was counted.

f. MEASUREMENT: DEGREE OF YELLOWING (DISCOLORATION)

The sample was knitted on a hosiery knitting machine and ultraviolet rays were projected on the knitted fabric by using a Carbon Arc Fadometer Model FA-2 produced by Toyo Rika Co., Ltd.

Irradiation with ultraviolet rays were carried out for 24 hours and the changes of color before and after the irradiation of ultraviolet rays was measured by using a Hunter Type Color Difference meter (produced by Color-machine Co., Ltd.), and the degree of yellowing is shown by the change of value (b).

g. METHOD FOR MEASURING THE CORE/SHEATH BLENDING RATIO

The drawn conjugate yarn product was cut perpendicular to the yarn axis by using a microtome, and the cut surface was dyed in an aqueous solution containing 0.02 percent of Rose aniline and 0.05 percent of orthochlorophenol at 80° C for 45 minutes.

After dyeing, the cut surface was observed with a phase contrast microscope to locate and examine the border line between the core component and the sheath component.

The blending ratio obtained and the blending ratio calculated from the ratio of revolutions of two gear-pumps of the spinning machine were compared.

In this manner, the thickness of the sheath component of the yarn obtained in Example 1 was obtained in accordance with this method.

h. METHOD FOR QUANTITATIVE ANALYSIS OF PHOSPHORUS COMPOUND CONTAINED IN YARN

This was carried out in accordance with the method as is described in the "HAND-BOOK OF CHEMICAL ANALYSIS" page 99, 1961 (published by Sangyo Tosho Co., Ltd.)

Specifically, the sample was decomposed with hydrochloric acid and nitric acid, and the decomposed sample was separately precipitated in the form of ammonium phosphomolybdate and the precipitate was dissolved in ammonia solution to precipitate the same in the form of magnesium ammonium phosphate and then it was heated into magnesium pyrophosphate and quantitative analysis was carried out on the magnesium pyrophosphate thus obtained.

TABLE 1

| Example No. | Process | Amount of hexabromobenzene (percent/polymer) | Amount of triphenylphosphate (percent/polymer) | Amount of halogen (percent/polymer) | Average combustion time (sec.) | Number of contacts of flame (times) | Yellowing degree (Hunter's value) Before treatment | Yellowing degree (Hunter's value) After treatment |
|---|---|---|---|---|---|---|---|---|
| Example 1 | Before treatment | 11.7 | 1.30 | 10.0 | 0.5 | 14.5 | +2.3 | +3.9 |
| | After scouring | 11.7 | 1.31 | 10.2 | 0.5 | 14.0 | +2.1 | +3.8 |
| | After dry-cleaning [1] | 11.6 | 1.29 | 10.1 | 0.7 | 13.2 | +2.0 | +3.8 |
| | After dyeing [2] | 11.5 | 1.30 | 10.0 | 0.5 | 14.5 | | |
| | After resin-processing [3] | 11.4 | 1.28 | 9.9 | 0.7 | 13.1 | +2.2 | +3.6 |
| Comparative Example 1 | Before treatment | 0 | 0 | 0 | | ([4]) | +2.5 | +3.8 |
| | After scouring | 0 | 0 | 0 | | ([4]) | +2.2 | +3.8 |
| | After dry-cleaning [1] | 0 | 0 | 0 | | ([4]) | +2.1 | +3.6 |
| | After dyeing [2] | 0 | 0 | 0 | | ([4]) | | |
| | After resin-processing [3] | 0 | 0 | 0 | | ([4]) | +2.4 | +3.6 |
| Comparative Example 2 | Before treatment | 0 | 1.29 | 0 | | ([4]) | | |
| | After scouring | 0 | 1.28 | 0 | | ([4]) | | |
| | After dry-cleaning [1] | 0 | 1.28 | 0 | | ([4]) | | |
| | After dyeing [2] | 0 | 1.29 | 0 | | ([4]) | | |
| | After resin-processing [3] | 0 | 1.27 | 0 | | ([4]) | | |
| Comparative Example 3 | Before treatment | 11.6 | 0 | 10.1 | 0.5 | 14.2 | +4.3 | +6.4 |
| | After scouring | 11.6 | 0 | 10.1 | 0.7 | 15.3 | +4.4 | +6.3 |
| | After dry-cleaning [1] | 11.4 | 0 | 9.9 | 0.6 | 14.8 | +4.8 | +6.3 |
| | After dyeing [2] | 11.5 | 0 | 10.0 | 0.8 | 13.2 | | |
| | After resin-processing [3] | 11.3 | 0 | 9.8 | 0.8 | 13.8 | +4.2 | +6.1 |

[1] Dry-cleaning was carried out after scouring.
[2] Dyeing was carried out after scouring.
[3] Resin processing was carried out after scouring.
[4] Wholly burnt away after one flame contact.

In Table 1, the polymer of Comparative Example 1 is a polymer which contained no additive and has no fire-retardancy at all.

The polymer of Comparative Example 2 contains only a phosphorous compound, i.e., (triphenylphosphate), and it does not show any fire retardancy.

The polymer of Comparative Example 3 is prepared by using hexabromobenzene, and there is no difference in fire-retardancy from the polymer of Example 1.

On the other hand, the heat resistance of the polymers of Example 1 and Comparative Example 3 was studied when the polymers were melted in the following results:

Specifically, the polymers were dried in vacuum at 180° C for three hours, and 100 g each of the polymers were placed in round bottom flasks, and an anchor type stirrer was provided on each of the round bottom flasks, and after having replaced the air inside of the flasks with nitrogen gas, the polymers were dissolved in a silicone oil bath at 280° C, and sampling was carried out each hour, and the intrinsic viscosity was measured.

The results are given in the following table.

| Heating time | 0 min. | 20 min. | 40 min. | 60 min. | 80 min. |
|---|---|---|---|---|---|
| Sample of Example 1 | 0.67 | 0.66 | 0.66 | 0.64 | 0.61 |
| Sample of comparative Example 3 | 0.66 | 0.60 | 0.53 | 0.49 | 0.40 |

Thus, the deterioration of intrinsic viscosity of the sample of Comparative Example 3 is substantial, while the intrinsic viscosity of the sample of Example 1 hardly deteriorated at all, and the heat resistance of this sample is very excellent.

The discoloration of the polymer of Example 1 is less than that of Comparative Example 3, as is apparent from the Hunter's ($b$) Value before the Fade-o-meter treatment of Table 1.

On the other hand, the state of conjugate-spinning of Example 1 and Comparative Example 3 were compared.

In Comparative Example 3, discolored yarn was produced in 50 hours after the start of the conjugate spinning, and thermally decomposed polymer amenated from the spinneret, breakage occurred in the yarn, and spinning was essentially impossible.

On the other hand, spinning was carried out smoothly and continuously for 120 hours in the case of the polymer of Example 1.

EXAMPLES 2 to 4

A core polymer was prepared in the same manner as in EXAMPLE 1 except that the mixing was carried out by blending pentabromotoluene and triphenylphosphite at various ratios as shown in Table 2 along with polyethylene terephthalate whose intrinsic viscosity (as measured in 25° C orthochlorophenol) was 0.810.

On the other hand, the sheath component was a copolyester (whose intrinsic viscosity was 0.654; the softening point thereof being 255° C) comprising 97 mol percent of polyethylene terephthalate and 3 mol percent of polyethylene isophthalate.

The volume ratio of the prepared core component and sheath component was 75/25, and the operation was carried out in the same manner as in EXAMPLE 1 except that the thickness of the sheath component was 2.9 $\mu$. The results are given in Table 2.

In Table 2, the results are given when the amount of halogen present was small (Comparative Example 4), and the results are also given in other examples when the amount of halogen was progressively larger.

TABLE 2

| Example | | Amount of pentabromotoluene (percent) | Amount of triphenyl phosphite (percent) | Amount of halogen (percent) | Average combustion time (sec.) | Number of contacts of flame (times) | Yellowing degree (Hunter's value) Before treatment | Yellowing degree (Hunter's value) After treatment |
|---|---|---|---|---|---|---|---|---|
| Comparative Example 4 | Before scouring | 4.8 | 1.0 | 3.9 | | ([1]) | 2.0 | 3.7 |
| | After scouring | 4.8 | 1.0 | 3.9 | | ([1]) | 2.5 | 3.6 |
| Example 2 | Before scouring | 9.0 | 2.2 | 7.4 | 0.8 | 12.3 | 2.1 | 3.2 |
| | After scouring | 9.1 | 2.3 | 7.5 | 0.9 | 12.1 | 2.4 | 3.7 |
| Example 3 | Before scouring | 16.2 | 2.3 | 13.3 | 0.1 | 16.1 | 2.4 | 3.9 |
| | After scouring | 15.8 | 2.4 | 13.0 | 0.3 | 16.5 | 2.8 | 3.8 |
| Example 4 | Before scouring | 37.1 | 3.7 | 30.4 | 0 | 20.1 | 3.1 | 4.0 |
| | After scouring | 35.8 | 3.8 | 29.4 | 0 | 21.3 | 3.3 | 4.1 |
| Comparative Example 5 | Before scouring | 73.0 | 18.1 | 59.9 | 0 | 21.2 | 6.3 | 8.9 |
| | After scouring | 68.5 | 17.1 | 56.2 | 0 | 19.8 | 6.2 | 8.8 |

[1] Wholly burnt away after one flame contact.

REMARK.—The strength of the yarn was sharply reduced in the case of Comparative Example 5.

EXAMPLE 5

The same core component and the same sheath component as in Example 1 were used, and the blending ratio was adjusted in such a manner that the area ratio of the cut surfaces cut perpendicularly across the longitudinal axis was CORE/SHEATH = 50/50.

The positions of the upper portion and the lowerportion of the spinneret in FIG. 2 were adjusted in a manner to produce eccentric conjugate and yarn.

In this case, a considerable amount of hexabromobenzene was sublimed from the spinneret when spinning was carried out.

When the amount of hexabromobenzene was measured, and it was determined that 20 g of hexabromobenzene were provided per kilogram of extruded polymer.

The thickness of the thinnest portion of the sheath component of the resulting eccentric conjugate yarn was measured and it was found out to be $0.5\mu$.

The resulting undrawn yarn was drawn, and a small amount of hexabromobenzene exuded on the draw rolls.

The amount of bromine contained in the drawn yarn was 8.1 percent by weight based on the amount of polymer, and the drawn yarn was subjected to after treatment as in Example 1, and hexabromobenzene was removed in the following manner.

|  | Amount of bromine (wt. %/polymer) |
|---|---|
| Untreated yarn | 8.1 |
| Scouring | 7.6 |
| Dry cleaning | 7.2 |
| Dyeing | 6.5 |

The yellowing degree was tested by using a Fade-o-meter, Value $b$ of the degree of yellowing of untreated yarn was +2.8, while Hunter's ($b$) value of the treated yarn was determined to be +5.6.

EXAMPLE 6

A core polymer was prepared in the same manner as in Example 1 except that 16 parts by weight of hexabromobenzene were used in the core polymer, and the same polymer as in Example 1 was used as the sheath polymer, and the number of revolutions of the gear pumps in the spinning machine was adjusted in such a manner that the blending ratio of CORE/SHEATH (volume ratio) was 85/15, and the rest of the concentric conjugate spinning was carried out in the same manner as in Example 1.

When spinning was carried out, hexabromobenzene was sublimed from the spinneret, in an amount of 15 g per kg of extruded polymer.

The thickness of the sheath component of the yarn was $1.6\mu$.

The amount of bromine contained in the drawn yarn was 11.7 percent by weight based on the amount of polymer.

When the drawn yarn was subjected to after treatment in the same manner as in Example 1, and the removal of hexabromobenzene was experienced in the following amounts.

|  | Remaining Amount of Bromine (% by weight based on the amount of polymer) |
|---|---|
| Untreated polymer | 11.7 |
| Scouring | 10.1 |
| Dry-cleaning | 9.6 |
| Dyeing | 7.2 |

The degree of yellowing as measured by a Fade-o-meter of the untreated polymer had a Hunter's ($b$) value of +2.9, while the Hunter's ($b$) value of the treated polymer was +6.2, and the polymer had deteriorated.

EXAMPLE 7

A core polymer was prepared in the same manner as in Example 1 except that the amount of hexabromobenzene was changed from 26 parts by weight to 23 parts by weight.

On the other hand, 3.5 parts by weight of hexabromobenzene and 0.5 part by weight of triphenylphosphate were added to the sheath polymer of Example 1 in accordance with the same method as in the preparation of the core polymer in Example 1, to prepare the sheath polymer.

The resulting polymer was subjected to a concentric conjugate spinning process in the same manner as in Example 1.

While spinning the obtained polymers, the number of revolutions of the gear pumps was adjusted in such a manner that the blending ratio of CORE/SHEATH became 50/50.

The sublimation of polymer could hardly be recognized, but for the sake of confirmation, the sublimed hexabromobenzene was 0.4 g per 1 kg of the extruded polymer.

The amount of bromine contained in the resulting drawn yarn was 11.5 percent by weight based on the weight of polymer.

The drawn yarn thus obtained was subjected to the same after-treatment as in Example 1, and hardly any hexabromobenzene was removed.

In regard to the results of the test for measuring degree of yellowing, the Hunter's ($b$) value before the treatment was +2.8 and, after the treatment, +3.7.

EXAMPLES 8 to 24

Core polymers were prepared using various halogen compounds of the present invention (in place of hexabromobenzene) as shown in the Table and by using various phosphorus compounds of the present invention as shown in the Table in the same manner as in Example 1.

The operation was carried out in the same manner as in Example 1 except that the kinds of additives were changed.

The same sheath polymer as in Example 1 was used, and the concentric conjugate spinning was carried out in accordance with the same method as in Example 1.

The blending ratio was adjusted by correcting the number of revolutions of the respective gear pumps in such a manner that the blending ratio became CORE/SHEATH = 50/50 (volume ratio).

Spinning and hosiery knitting and aftertreatment were all carried out in the same manner as in Example 1.

The measurements of fire-retardancy and yellowing degree were carried out in the same manner as in Example 1.

In regard to the heat resistance, the intrinsic viscosity obtained before the treatment and the intrinsic viscosity after thermal treatment for 60 minutes carried out in the same manner as in Example 1, are given.

However, the intrinsic viscosity was obtained by correcting the intrinsic viscosity as measured in orthochlorophenol at 25° C proportionally by the weight of the added halogen compound.

Specifically, the intrinsic viscosity is represented by the formula:

$$a \times (100+b)/100$$

(wherein a stands for measured value; the amount of halogen compound is $b$ percent by weight based on the weight of polymer).

In regard to the spinning state, the spinning state of the case when spinning was carried out continuously for 120 hours, is given.

The results are given in Table III.

In order to clarify the effect of the present invention, the results of Comparative Examples from 6 to 7 are given in Table III.

In the above mentioned comparative examples, the volume ratio of halogen compound and phosphorus compound is outside the range of the present invention. v,55

TABLE III

| Example No. | Halogen compound - Compound | Amount, wt. percent/polymer | Phosphorus compound - Compound | Amount, wt. percent/polymer |
|---|---|---|---|---|
| 8 | Tetrabromophenyl-propyl benzene (Br₄C₆-CH₂CH₂CH₂CH₃) | 33.1 | $P{-}(O{-}C_6H_5)_3$ | 3.0 |
| 9 | Octachlorobiphenyl | 33.3 | $P{-}(O{-}C_6H_4{-}Br)_3$ | 3.0 |
| 10 | Octabromo-p-terphenyl | 31.9 | $P{-}(OC_5H_5)_3$ | 3.2 |
| 11 | Pentabromodiphenylmethane | 35.2 | $P{-}(OCH_2{-}C_6H_5)_3$ | 3.0 |
| 12 | Pentachloro-4-methylbiphenyl | 48.0 | $P{-}(O{-}C_6H_{11})_3$ | 3.2 |
| 13 | Pentachlorobenzyl chloride | 31.7 | $P{-}(OCH_2CHCH_2)_3$ with Br Br substituents | 3.4 |
| 14 | Octabromodiphenyl ether | 28.6 | $\overset{O}{\underset{\parallel}{P}}{-}(OCH_2{-}C_6H_4{-}Br)_3$ | 3.0 |
| 15 | Pentachlorophenyl benzyl ether | 48.6 | $P{-}(OCH_2{-}C_6H_4{-}Cl)_3$ | 3.4 |
| 16 | Octachloro-4-methyldiphenyl ether | 36.4 | $\overset{O}{\underset{\parallel}{P}}{-}(OCH_2CH_2CH_2)_3$ with Cl Cl | 3.0 |
| 17 | 1,2-bis(2,4,6-tribromophenoxy)ethane | 34.0 | $\overset{O}{\underset{\parallel}{P}}{-}(OCH_2Cl)_3$ | 3.0 |
| 18 | Tetrabromo-bis(methoxy)-dimethyl-diphenylmethane | 44.7 | $\overset{O}{\underset{\parallel}{P}}{-}(O{-}C_6H_5)_3$ | 3.0 |
| 19 | 1,3,5-tribromo-2,4,6-tris(bromomethyl)benzene | 30.9 | $\overset{O}{\underset{\parallel}{P}}{-}(O{-}CH_3)_3$ | 3.0 |

TABLE III—Continued

| Example No. | Halogen compound Compound | Amount, wt. percent/ polymer | Phosphorus compound Compound | Amount, wt. percent/ polymer |
|---|---|---|---|---|
| 20 | 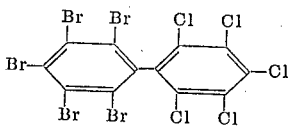 | 31.2 | 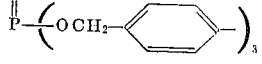 | 3.0 |
| 21 | 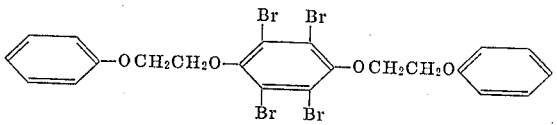 | 52.0 | 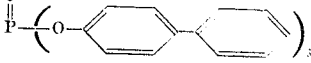 | 2.8 |
| 22 | 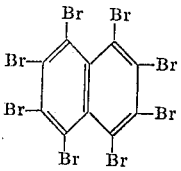 | 39.6 | 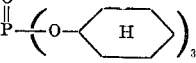 | 3.0 |
| 23 | 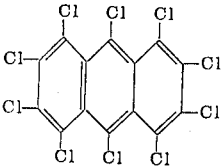 | 34.6 | 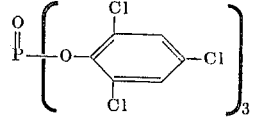 | 3.0 |
| 24 | 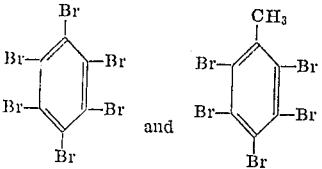 and 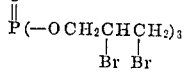 | 23.0, 3.3 | 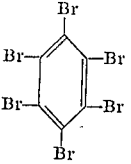 | 3.4 |
| Comparative Example 6 | 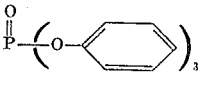 | 28.7 | 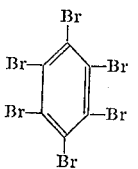 | 9.0 |
| Comparative Example 7 | 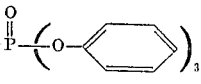 | 28.7 | 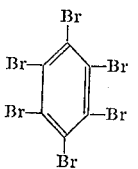 | 0.3 |

| Example No. | Amount of halogen contained in yarn, wt. percent polymer | Amount of phosphorus contained in yarn, wt. percent polymer | Heat resistance of core polymer Before treatment | Heat resistance of core polymer After treatment | Amount of sublimation during spinning, g./1. kg. of polymer | Fire retardancy, number of contacts of flame |
|---|---|---|---|---|---|---|
| 8 | 12.3 | 1.6 | 0.821 | 0.758 | 0.2 | 16.1 |
| 9 | 12.5 | 1.4 | 0.815 | 0.772 | 0.4 | 15.3 |
| 10 | 13.1 | 1.7 | 0.793 | 0.745 | 0.4 | 14.2 |
| 11 | 12.3 | 1.5 | 0.812 | 0.778 | 0.5 | 15.1 |
| 12 | 12.1 | 1.7 | 0.797 | 0.753 | 0.3 | 16.2 |
| 13 | 12.8 | 1.8 | 0.999 | 0.742 | 0.3 | 15.3 |
| 14 | 12.0 | 1.5 | 0.910 | 0.765 | 0.3 | 14.5 |
| 15 | 12.7 | 1.8 | 0.801 | 0.751 | 0.5 | 16.2 |
| 16 | 12.4 | 1.6 | 0.807 | 0.749 | 0.3 | 15.2 |
| 17 | 12.4 | 1.5 | 0.795 | 0.748 | 0.5 | 14.8 |
| 18 | 12.9 | 1.5 | 0.803 | 0.761 | 0.6 | 15.3 |
| 19 | 13.0 | 1.4 | 0.792 | 0.753 | 0.3 | 16.2 |
| 20 | 12.4 | 1.4 | 0.788 | 0.749 | 0.3 | 15.1 |
| 21 | 12.5 | 1.3 | 0.795 | 0.742 | 0.7 | 15.5 |
| 22 | 12.8 | 1.5 | 0.800 | 0.758 | 0.4 | 14.8 |
| 23 | 12.1 | 1.6 | 0.804 | 0.756 | 0.4 | 16.3 |
| 24 | 12.6 | 1.8 | 0.812 | 0.782 | 0.3 | 15.2 |
| Comparative Example 6 | 12.7 | 4.6 | 0.798 | 0.661 | 0.3 | 3.2 |
| Comparative Example 7 | 12.5 | 0.14 | 0.781 | 0.530 | 0.3 | 15.2 |

| Example NO. | Yellowing degree (Hunter's value) Before treatment | After | Spinning state |
|---|---|---|---|
| 8 | +2.8 | +3.8 | Excellent |
| 9 | +2.6 | +3.5 | Excellent |
| 10 | +2.3 | +3.4 | Excellent |
| 11 | +2.4 | +3.5 | Excellent |
| 12 | +2.6 | +3.8 | Excellent |
| 13 | +2.2 | +3.5 | Excellent |
| 14 | +2.5 | +3.5 | Excellent |
| 15 | +2.3 | +3.4 | Excellent |
| 16 | +2.0 | +3.2 | Excellent |
| 17 | +2.1 | +3.2 | Excellent |
| 18 | +2.1 | +3.3 | Excellent |
| 19 | +2.1 | +3.3 | Excellent |
| 20 | +2.2 | +3.5 | Excellent |
| 21 | +2.1 | +3.2 | Excellent |
| 22 | +2.4 | +3.7 | Excellent |
| 23 | +2.5 | +3.8 | Excellent |
| 24 | +2.8 | +3.8 | Excellent |
| Comparative Example 6 | +3.5 | +4.8 | Polymer is dripped from the spinning nozzle and yarn-breakage is frequent |
| Comparative Example 7 | +6.2 | +9.1 | Ditto |

EXAMPLE 25

100 parts by weight of polycaprolactam was used as the core polymer in place of polyethylene terephthalate which was used in Example 1 and the relative viscosity of said polymer was 2.63 as measured in a 1 percent solution of 98 percent sulfuric acid at 25° C.

26 parts by weight of hexabromobenzene and 3 parts by weight of triphenylphosphate were added thereto in the same manner as in Example 1.

As the sheath polymer, polycaprolactam whose relative viscosity was 2.58 was used, and the above two kinds of polymers were subjected to the concentric conjugated spinning process in accordance with the method of Example 1.

The gear pumps were adjusted in such a manner that the blending ratio of core polymer and sheath polymer was 50/50 (volume ratio).

The core component and the sheath component were respectively melted at 240° C and 250° C.

The sublimation of hexabromobenzene was hardly observable at the spinneret when the spinning operation was carried out, and when the sublimed hexabromobenzene was collected, its amount was found to be 0.2 g per 1 kg of the extruded polymer.

The spinning properties of the product were excellent, and spinning was continuously carried out for 120 hours.

The drawn yarn was knitted into hosiery in the same manner as in Example 1.

Its fire-retardancy was excellent [the number of contacts of flame was 17.1].

In regard to yellowing degree, Hunter's ($b$) value before the treatment was +3.8, and Hunter's ($b$) value after the treatment was +4.6.

EXAMPLE 26

The core polymer and sheath polymer were prepared in the same manner as in Example 25 except that polyhexamethylene adipamide was used in place of polycaprolactam.

The relative viscosity of the polyhexamethylene adipamide, which was used as the core polymer, was 2.58 as measured in the same manner as in Example 25. The relative viscosity of the polyhexamethylene adipamide, which was used as the sheath polymer, was 2.52.

These polymers were subjected to the concentric conjugate spinning process in the same manner as in Example 1.

The melting of the core component and the sheath component was carried out respectively at 280° C and 290° C.

The blending ratio of core and sheath was 50/50 [volume ratio], but the spinning properties were excellent, and hardly any sublimation of hexabromobenzene from the spinneret was recognized during the spinning process.

After knitting hosiery from the drawn yarn, the fire-retardancy of the knitted product was tested.

The number of contacts of flame was 19.2, and the heat resistance of the product was excellent.

In regard to yellowing degree, the Hunter's ($b$) value before the treatment was +3.5, and after the treatment +4.9.

EXAMPLE 27

Concentric conjugate spinning was carried out in the same manner as in Example 1 except that a polycaprolactam containing hexabromobenzene and triphenylphosphate was used as the core polymer in Example 25.

The melting of the core polymer and sheath polymer was carried out respectively at 250° C and 290° C.

The blending ratio of the core polymer against the sheath polymer was 50/50 [volume ratio].

The spinning properties ere excellent, and spinning was continuously carried out for 120 hours, with no yarn breaking.

Hardly any sublimation from the spinneret was recognized during the spinning process.

The drawn yarn was knitted into hosiery, and the fire-retardancy of the knitted product was tested; the number of contacts of flame was 16.3 times.

As a result of the measurement of yellowing degree, the Hunter's ($b$) value was +2.7 before the treatment, and the Hunter's ($b$) value after the treatment was +3.4.

COMPARATIVE EXAMPLE 8

Concentric conjugate spinning was carried out in the same manner as in Example 1 that a mixture of 100 parts by weight of polyethylene terephthalate, 7 parts by weight of hexabromobenzene, and 1 part by weight of triphenylphosphate was used as the core polymer, and a mixture of 100 parts by weight of polyethylene terephthalate, 5 parts by weight of polyethylene terephthalate, 5 parts by weight of hexabromobenzene, and 0.5 parts by weight of triphenylphosphate, was used as the sheath polymer.

The blending ratio of the core polymer and the sheath polymer was 50/50 [volume ratio].

The spinning process was continuously carried out for 120 hours, but yarn breaking was encountered 14 times.

The sublimation from the nozzle during the spinning process was remarkable, and the amount of collected polymer was 25 g per kg of the extruded polymer.

The drawn yarn was knitted into hosiery and the degree of yellowing was measured, and Hunter's ($b$) value before the treatment was +6.8 and the Hunter's ($b$) value after the treatment was +12.8, and the degree of yellowing was remarkably deteriorated.

The amount of bromine contained in the drawn yarn was 9.8 percent by weight of polymer, but after scouring the amount of bromine was 9.0 percent by weight of polymer, and after dry-cleaning it was decreased as far as 9.1 percent by weight, and the removal of bromine by after-treatment was remarkable.

The following is claimed:

1. A conjugate sheath and core fiber comprising a thermoplastic sheath polymer and a thermoplastic core polymer contained separately within said sheath polymer, said core polymer containing more than 5 percent by weight of a halogenated fire-retardant and of a phosphorus compound fire-retardant uniformly blended in said core polymer, the halogen content of said halogenated fire-retardant in said core polymer being present in an amount of about 3 to 50 times the amount of said phosphorus compound fire-retardant in said core polymer.

2. The fiber defined in clam 1, wherein the sheath polymer also contains said halogenated fire-retardant and said phosphorus compound fire-retardant, in a lesser percentage than in said core polymer, and wherein the maximum weight of halogen in the sheath component is 10 percent of the weight of the sheath polymer.

3. A fire-retardant sheath and core type conjugate fiber comprising (A) a core composed of a thermoplastic polymer containing a blend of (a) a halogenated member selected from the group consisting of a ring compound represented by the general formula [I], halogenated naphthalene wherein the halogen is selected from the group consisting of chlorine and bromine, and halogenated anthracene wherein the halogen is selected from the group consisting of chlorine and bromine, and (b) a phosphorus-containing compound selected from the compounds represented by the general formulae [II] and [III] the total amount of halogen contained in said core polymer being above about 5.0 percent by weight based on the amount of thermoplastic polymer, and wherein:

Formula [I] is

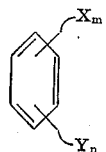

[I]

wherein Formula [II] is

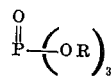

[II]

and wherein Formula [III] is

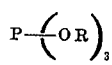

[III]

wherein X is a halogen selected from the group consisting of chlorine and bromine; Y is a radical selected from the group consisting of —R', —OR', and —OR''OR', wherein R' is selected from the group consisting of alkyl radicals having from one to 10 carbon atoms, aryl radicals having from six to 24 carbon atoms, aralkyl radicals having from six to 16 carbon atoms, alkaryl radicals having from six to 16 carbon atoms, and the halides thereof; R'' is an alkylene radical having from one to six carbon atoms; $n$ and $m$ are 0 or positive integers within the definitions of equations $$6 \geq m \geq 1; 5 \geq n \geq 0$$

and wherein R is selected from the group consisting of alkyl radicals having from one to 10 carbon atoms, aryl radicals having from six to 24 carbon atoms, aralkyl radicals having from six to 16 carbon atoms, cycloalkyl radicals having from five to seven carbon atoms, and the halides thereof and wherein the $$\frac{\text{Weight percent of halogen of the compound represented by the [I], and/or halogenated naphthalene or anthracene based on the amount of thermoplastic polymer}}{\text{Weight percent of the member selected from the group of the compounds represented by the general formulae [II] and [III] against the weight of thermoplastic polymer}} = 3 \text{ to } 50 \quad [IV]$$

and (B) a sheath composed of a synthetic thermoplastic polymer disposed about said core.

4. Sheath and core type conjugate fiber according to claim 3 wherein the percentage of halogen in the sheath is below 10.0 percent by weight of the weight of the thermoplastic polymer in the sheath.

5. Sheath and core type conjugate fiber according to claim 3 wherein the core contains bromine and the amount of bromine contained in the core is more than 5.0 percent by weight based on the weight of thermoplastic polymer in the core and the sheath contains less than 5.0 percent by weight of bromine based on the amount of thermoplastic polymer in the sheath.

6. Sheath and core type conjugate fiber according to claim 4 wherein the core contains chlorine in an amount that is more than 10.0 percent by weight based on the weight of thermoplastic polymer in the core, and the sheath contains less than 10.0 percent by weight of chlorine based on the amount of thermoplastic polymer in the sheath.

7. Sheath and core type conjugate fiber according to claim 3 wherein the formula [I] compound is selected from the group consisting of hexabromobenzene and pentabromotoluene.

8. Sheath and core type conjugate fiber according to claim 3 wherein the formula [II] compound is triphenylphosphate.

9. Sheath and core type conjugate fiber according to claim 3 wherein the formula [III] compound is triphenylphosphite.

10. Sheath and core type conjugate fiber according to claim 3 wherein the blending ratio by volume of the core and the sheath is from 80/20 to 20/80.

11. Sheath and core type conjugate fiber according to claim 3 wherein the cross-sectional thickness of the sheath is more than $1\mu$. $\mu$.

12. Sheath and core type conjugate fiber according to claim 3 wherein the thermoplastic polymer is Nylon 6.

13. Sheath and core type conjugate fiber according to claim 3 wherein said thermoplastic polymer is Nylon 66.

14. Sheath and core type conjugate fiber according to claim 3 wherein said thermoplastic polymer is a polyester wherein at least 70 percent of the recurring unit thereof is composed of polyethylene terephthalate.

* * * * *